United States Patent [19]

Stoffel et al.

[11] 4,103,560

[45] Aug. 1, 1978

[54] DAY-NIGHT MIRROR CONTROL APPARATUS

[76] Inventors: Robert W. Stoffel, 1890 Le Tarte; Robert A. Berntsen, 4295 Armstrong Rd., both of Muskegon, Mich. 49441

[21] Appl. No.: 778,701

[22] Filed: Mar. 17, 1977

[51] Int. Cl.² .............................................. F16C 1/14
[52] U.S. Cl. .................................. 74/501 M; 350/282
[58] Field of Search ............. 74/501 M; 350/282, 280, 350/279, 278

[56] References Cited

U.S. PATENT DOCUMENTS

| 3,650,606 | 3/1972 | Van Noord | 74/501 M |
|---|---|---|---|
| 3,712,149 | 1/1973 | Van Noord | 74/501 M |
| 3,810,690 | 5/1974 | Klein | 74/501 M |

*Primary Examiner*—Clarence R. Gordon
*Attorney, Agent, or Firm*—Crisman & Moore

[57] ABSTRACT

Remote control, day-night, outside rearview mirror control apparatus. The control structure includes a plurality of interconnection cables linking an orthogonally pivotable, double sided vehicle mirror and multi-axial actuation, operator control mechanism. Mirror movement in the form of yaw about the vertical axis thereof is facilitated via swivel motion of a control bat resulting in axial movement of cables terminating outwardly of the reference axis of the mirror. Mirror movement about the horizontal axis thereof, including 180° flipping and control pitch adjustment, is facilitated through a single cable, double action mechanical servo which is responsive to axial and rotational control bat movement. The servo may be positioned adjacent the mirror or control bat and utilizes a spring loaded cam biased within a rotable casing to independently differentiate mirror pitch adjustment signals from day-night flip signals in a fashion which permits 180° repositioning of the mirror to identical mirror viewing positions. In this manner, the mirror is maintained in its preadjusted orthogonal viewing orientation for both day and night operation. In an alternative construction of the mechanical servo, the pitch and flip control is effected through a pull cable system wherein the servo is disposed adjacent the control bat and incorporates a double action mechanical cable linkage, responsive to axial and rotational movement therefrom. While both constructions incorporate the principles of the present invention, the dual cable mirror drive as compared to the single cable version is more readily adaptable to conventional outside mirror apparatus.

31 Claims, 11 Drawing Figures

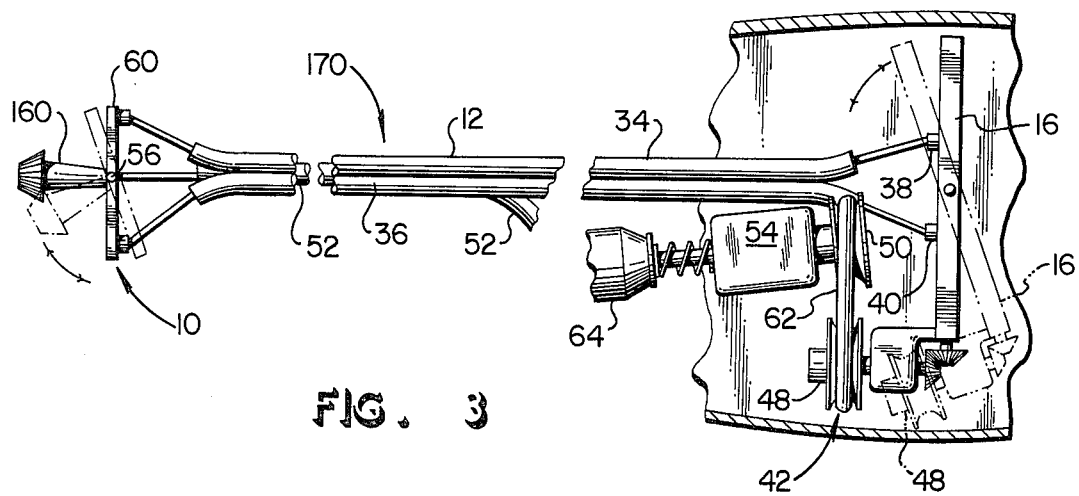
FIG. 3
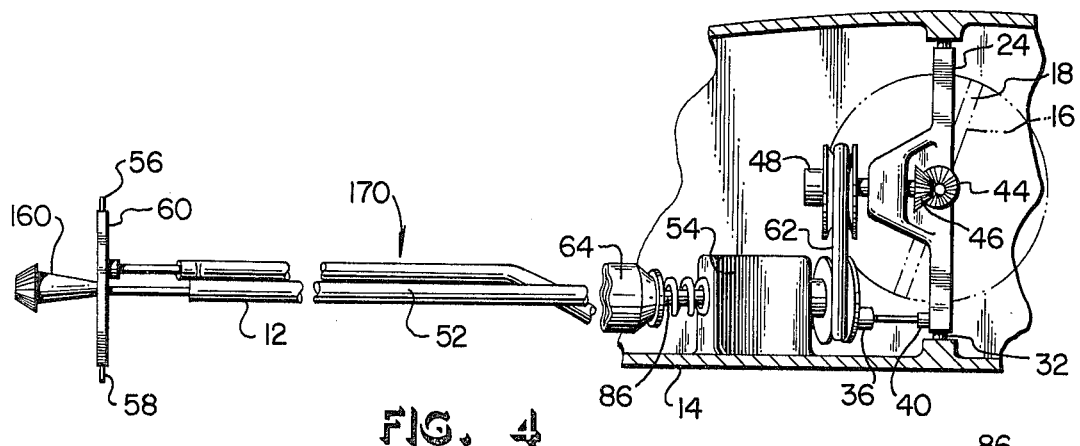
FIG. 4
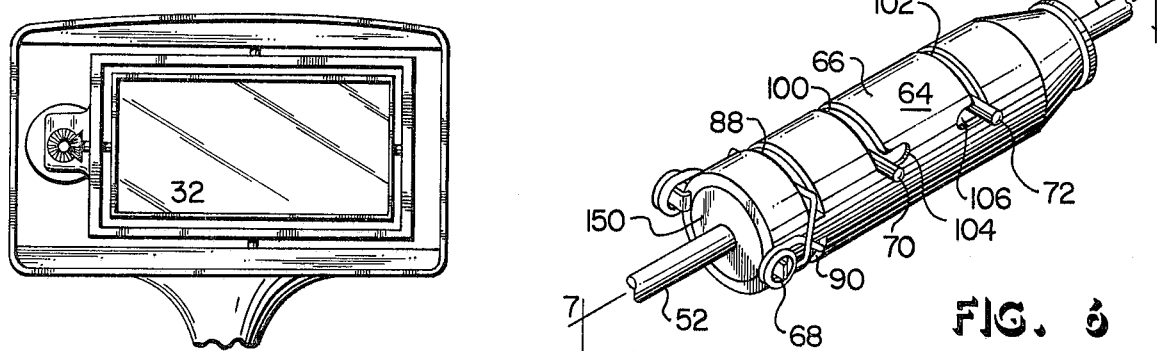
FIG. 5
FIG. 6
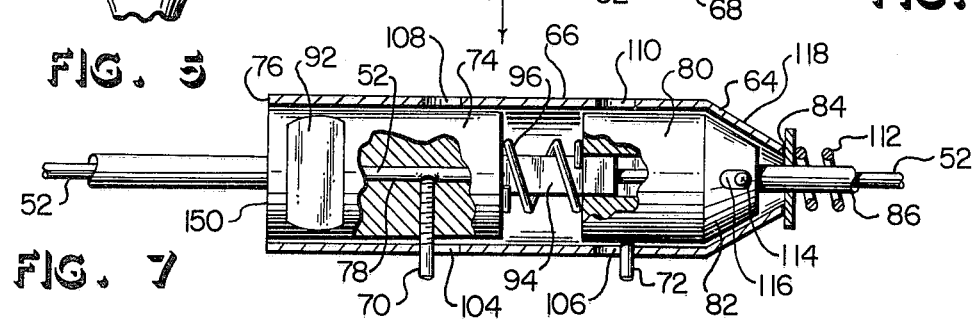
FIG. 7

DAY-NIGHT MIRROR CONTROL APPARATUS

BACKGROUND OF THE INVENTION

Rearview mirrors have been included as standard equipment inside conventional automobiles and related vehicles for decades. Such apparatus provides an invaluable safety function in that the operator may, at will, ascertain the traffic condition behind him through a minor eye movement. Outside rearview mirrors have also been provided which facilitate viewing the roadway traffic beside or diagonally behind the operator's vehicle out of view of conventional "inside" mirrors. In the not too distant past, inside rearview mirrors have included "day-night" features which permit the operator to select the most advantageous viewing configuration for the time of day. The configuration adjustments have commonly been centered in the mirror reflective surfaces.

Prior art day-night mirrors, used inside automobiles, at one time included two mirrors placed back-to-back and pivoted to provide either a bright image reflection for daytime viewing or a darkened reflection for nighttime viewing purposes. It has been shown, however, that the function of reaching up and manually flipping the mirror from day to night position also necessitates an inconvenient resetting of the viewing pitch and yaw angle. Such requisite adjustments have limited the effectiveness of these mirrors in that the operator often decides to leave it in the day position rather than readjust it.

More recent prior art day-night mirrors for inside the automobile include a bright image mirror that has a plain see-through glass disposed in front of it. The bright image surface is for daytime viewing and when it is tilted up, at night, so that it reflects the darkened interior of the car, the plain glass surface provides a rearview image. In this manner, only the residual image appears on the see-through glass and the harsh headlights of adjacent traffic are reflected off the tilted bright image surface and upwardly above the operator. The apparatus providing such an adjustability function is basic. Fixed stops and detent means establish the end positions for each day night adjustment. Viewing pitch and yaw angles are adjusted by orienting the mirror housing and no secondary adjustments for viewing angles are necessary when switching from night to day, or vice versa. Such mirrors have thus found wide spread acceptance in the automotive industry.

The standard see-through glass apparatus of the inside mirror will not work as an outside rearview mirror. The reflection of street lights, neon signs, lighted buildings nad the like would be picked up by the tilted mirror surface. This would produce a dangerous double image to the operator. Therefore, double sided mirrors utilized for outside rearview mirrors which eliminate double reflection have been the subject of development efforts. The main problem with such apparatus is the remote adjustability of such mirrors between day and night positions, as discussed above. Certain prior art structures have addressed this problem by providing multiple unit cable linkages between the mirror and a central unit on the automobile door adjacent the operator. One such remote control device is shown and described in U.S. Pat. No. 3,650,606, issued to Andrew J. Van Voord in 1972. This mirror control device disclosed therein includes a four wire cable adapted for turning the mirror supporting member right or left and up and down. In combination, these functions allow the operator to both flip the mirror 180° and adjust it at each end of the flip for proper viewing angles.

Other prior art remote control structures for outside rearview mirrors have included prismatical mirrors, fluid mirrors and related double sided mirrors. Each mirror structure generally includes a double control for manually changing the pitch and yaw viewing angle and day-night configuration. Beside being inherentaly complicated and concomitantly expensive, several of these structures exhibit a common adjustability malady. Generally each flip style mirror must be adjusted at the end of the flip for the proper viewing angle. Although controls are provided for remote adjustment, again such functions require manual effort and pose an inconvenience for the operator.

It would be an advantage therefore to provide a day-night outside rearview mirror, the day-night configuration of which can be obtained without the necessity of readjusting the viewing angle thereof. It is therefore the purpose of the present invention to overcome the problems of the prior art devices by therein controlling the actuation of a double sided mirror wherein it can be flipped from day to night viewing positions while maintaining the same viewing angle at each end. A mechanical servo is therefore provided for segregating mirror adjust signals from an input bezel into flip and pitch adjustments transmissions. The servo is constructed to permit only one mode of pitch signal at a time, therein retaining the configuration of the other. In this manner, the servo functions as a remote control transducer and mirror position memory bank for the convenience of the operator.

SUMMARY OF THE INVENTION

The invention relates to an apparatus for remote control of outside, day-night, rearview vehicular mirrors, wherein the fine pitch and yaw adjustments of a double sided mirror are segregated from, and uneffected by the flip actuation thereof. More particularly, one aspect of the invention includes an improved control structure for an outside mirror of the type having reflective surfaces on relative opposite sides thereof and supported within gimbal mounted frame means. The mirror frame is connected to a control bat through a series of cables adapted for synchronous pivotal control of the mirror in its bi-axial field of view and day-night, flip configuration. The improvement comprises a mechanical servo adapted for flipping the mirror to respectively identical field of view positions, wherein the pitch and yaw positions relative to the operator are the same and do not have to be readjusted. The servo is interposed between the mirror and control bat and includes a housing having a transducer assembly mounted therein. The transducer is coupled to the housing in selectable interengagement which is responsive to control bat signals. The selectable interengagement permits the operator to move the transducer in one mode of field of view adjustment and in a second, independent, mode of day-night flipping. In this manner no readjustments are necessary.

In another aspect of the invention, there is provided a mechanical servo for a double sided mirror of the type gimbal mounted in first and second frame members for orthogonal pivotability, one to the other. The servo includes a housing secured relative to the mirror between it and a control bezel from which yaw and pitch signals are generated. A signal transducer is mounted within the housing and connected to a first end of control cables adapted for carrying mirror pitch adjustment and flip signals. A clutch interconnects the transducer and the housing for selective linear and rotational movement therebetween in response to input movement of the control bezel. Means are provided for biasing the transducer member into a controlled shift configuration wherein rotation of the transducer relative to the housing is biased into one of two positions effecting a resultant 180° pitch setting of the mirror.

In another aspect of the invention the signal transducer comprises a shaft rotatably mounted within a generally cylindrical housing and adapted for both linear and rotational movement. Transducer actuation is responsive to input signals generated at the control bezel by the vehicle operator. The transducer is rotationally biased from the housing through a controlled shift mode, wherein all transducer rotation is forced into one of two stable positions. The clutch frictionally interconnects the housing and the transducer so that unless the clutch is disengaged, the housing biases the transducer and permits only flip adjustments of the mirror. The clutch is disengaged by linear movement of the transducer within the housing which secures the housing thereto through a set of limit pins therein. In this manner, the housing and transducer can be rotated for fine pitch adjustment of the mirror without effecting the 180° flip mode which produces the same pitch setting at each end of the flip phase.

In yet another aspect of the present invention, the housing includes a pull cable frame wherein the transducer is rotatably mounted therein. The transducer in this particular embodiment incorporates an eccentric control bat spring biased into one of two respective new positions. Linear movement of the control bat portion of the transducer similarly disengages a clutch secured thereto to permit fine pitch adjustment. The sides of an extended bezel portion of the housing provide the limit stops for the flip actuation of the mirror. In this particular embodiment, the single control bat effectively control both yaw and pitch adjustments independent of the flip control of the mirror, but with a dual cable mirror drive as compared to the signle cable drive set forth above. In this manner, the mechanical servo may be adapted for both existing and new outside mirror structures incorporating gimbal frame mounts.

BRIEF DESCRIPTION OF THE DRAWINGS

For a more complete understanding of the present invention, and, for further objects and advantages thereof, reference may now be had to the following description taken in conjunction with the accompanying drawings, in which:

FIG. 3 is a fragmentary, top plan view of the apparatus of FIG. 1 with portions of the mirror housing cut away to illustrate in more detail the positional adjustment of the mirror therein about its vertical axis;

FIG. 4 is a fragmentary, side elevational view of the apparatus of FIG. 1 with portions of the mirror housing cut away to illustrate in more detail the actuation and control of the mirror movement therein about its horizontal axis;

FIG. 5 is a front elevational view of the mirror housing of FIG. 1, illustrating the relative positioning of the particular embodiment of the control structure shown in FIGS. 3 and 4;

FIG. 6 is an enlarged, perspective view of one embodiment of a mechanical servo apparatus providing pre-programmed mirror movement about its horizontal axis;

FIG. 7 is an enlarged, cross-sectional view of mechanical servo of FIG. 6, taken along the lines 7—7 thereof and illustrating the operational elements therein;

DETAILED DESCRIPTION

Figure 1:
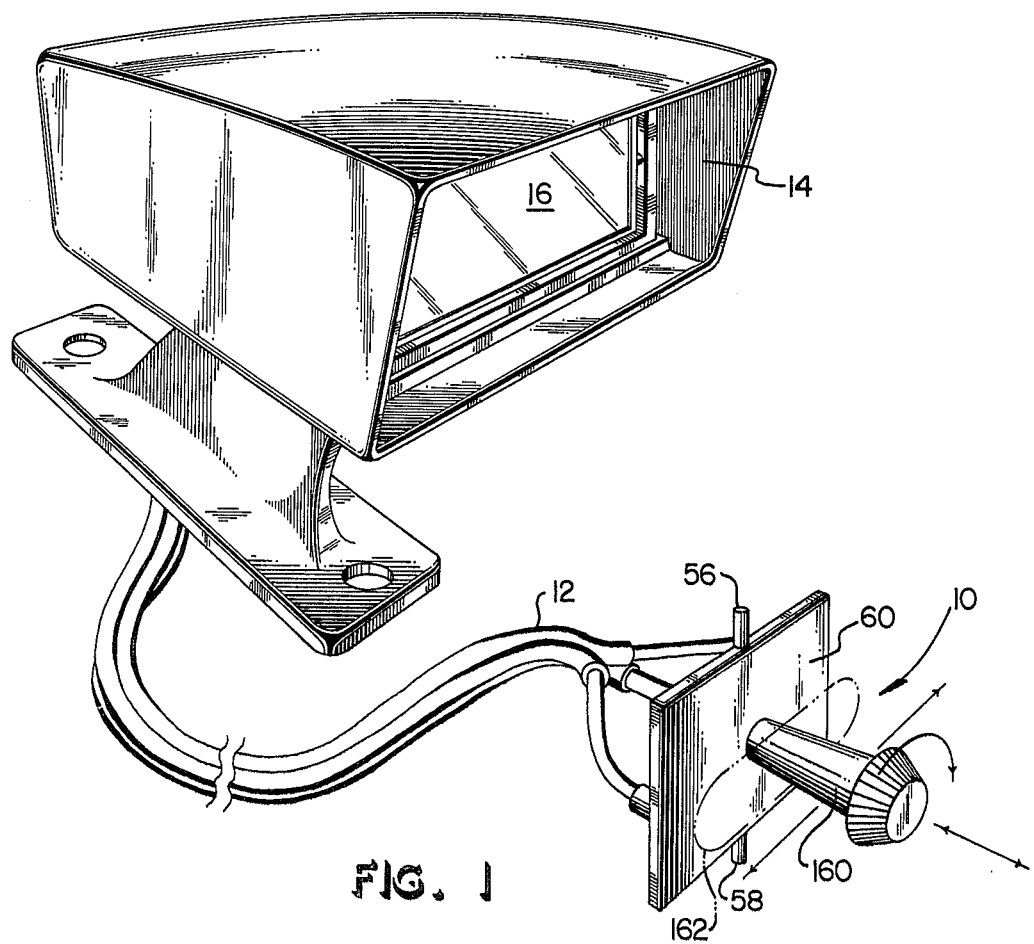
FIG. 1 is a fragmentary, perspective view of a day-night mirror and one embodiment of control apparatus constructed in accordance with the principles of the present invention, and illustrating an outside mirror housing interconnected to a control mechanism through a plurality of control cables.

Referring first to FIG. 1, there is shown a perspective view of a day-night, rearview mirror and control apparatus therefore constructed in accordance with the principles of the present invention. The illustrated apparatus includes a mirror control unit 10 connected via control cables 12 to a mirror housing 14 of the type adapted for securement to the outside of a vehicle (not shown). The mirror housing 14 includes a mirror 16 having a reflecting surface on both sides, one adapted for daytime viewing, and the other for nighttime viewing, purposes. Position and viewing orientation of the mirror 16 is regulated by the control unit 10, adapted for installation inside the vehicle convenient to the operator thereof.

Figure 2:
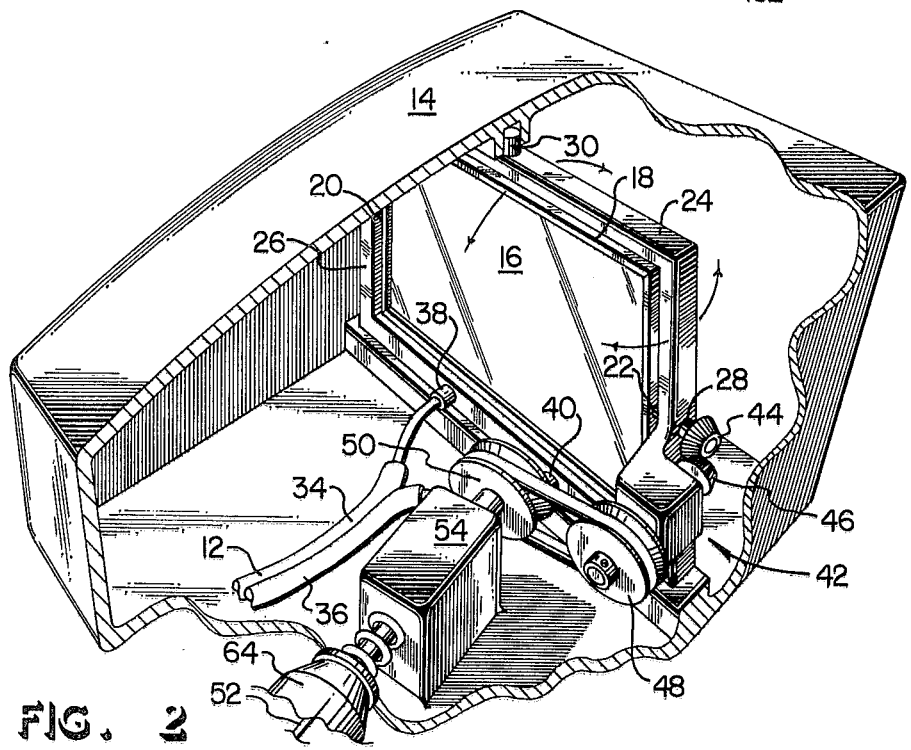
FIG. 2 is an enlarged, fragmentary, perspective view of the mirror housing of FIG. 1 with a portion thereof cut away to illustrate the actuation and movement of the mirror supported therein.

Referring now to FIG. 2, there is shown the mirror 16 positioned inside the housing 14 and pivotally supported for orthogonal movement therein. A first mirror frame 18, securely fixed about the mirror 16, is pivotally mounted for movement about a horizontal axis through a set of pivot shafts 20 and 22 affixed to the side walls thereof. A second mirror pivot frame 24 is provided outwardly of the first frame 18 and peripherally therearound for axial support thereof through pivot bearings 26 and 28 which receive pivot shafts 20 and 22, respectively, therethrough. The frame 24 is pivotally mounted to the housing 14 through upper shaft 30 and lower shaft 32 (not visible in FIG. 2), secured to, and extending from, the top and bottom frame elements respectively to define a vertical axis of rotation. In this manner the mirror 16 is effectively gimbal mounted and has the capacity for multi-axial orientation. Although peripherally encompassing frame elements are shown, it is to be understood that any conventional two axes mirror mount is contemplated.

Still referring to FIG. 2, there is shown a network of controls for effecting and maintaining the select position of the mirror 16 about its respective orthogonal axes. Two elements of cable 12 are therefore shown to terminate inside the housing 14 for positioning the mirror 16 with side-to-side movement, herein referred to as yaw. The yaw control is provided in this particular embodiment of cable 12 with shielded cable elements 34 and 36. The end of cable element 34 is secured to the bottom element of mirror frame 24 at a point 38 disposed to the left of the vertical axis thereof. The end of cable element 36 is secured to the bottom element of mirror frame 24 at a point 40 disposed to the right of the vertical axis thereof. Linear movement of the cables 34 and 36 thus causes pivoting of the mirror frame 24 and the control elements attached thereto. In this manner, the lateral viewing field of the mirror 16 may be remotely controlled for the convenience of the operator.

Pivoting of the mirror 16 about its horizontal axis may be accomplished by a cable system as set forth above or by a gear drive as herein described. Such mirror pivoting will produce two results. First, relatively minor adjustments of the mirror 16 and frame 18 about the horizontal axis, generally in the range of 0° to 10°, varies the vertical viewing field of the operator and is herein referred to as pitch. A 180° adjustment of the mirror 16 and frame 18 about the horizontal axis is herein referred to as a flip and positions the opposite reflecting surface of the mirror 16 in operational position. Both flip and pitch control are effected by position transducer system 42 comprising bevel gears 44 and 46 in drive engagement with mating pulleys 48 and 50. The transducer system 42 is actuated and driven by a third shielded cable element 52 of cable 12, which is coupled to pulley 50 outwardly of a mounting bulkhead 54. In this manner a single cable element 52 can be utilized to transmit both pitch and flip signals independently of one another, and, in a fashion most convenient to the operator thereof, as will be described in more detail below.

Referring now to FIG. 3, a top plan view of the apparatus of FIG. 1 illustrates the yaw movement and control of mirror 16. It may be seen that mirror yaw is effected by side-to-side movement of the control unit 10 which is preferably pivotally mounted in the door panel of the vehicle. Pivot shafts 56 and 58 (shown in FIG. 4) are thus provided on the top and bottom of a swivel plate 60, which shafts are adapted for pivotal mounting in a conventional manner. Yaw cables 34 and 36 are terminated and secured to the swivel plate 60 for effecting responsive yaw of the mirror 16 as illustrated. It may be seen that the respective angulations of the plate 60 and mirror 16 are not necessarily equivalent, selection of preferred angulation relationship being accomplished by respective angulation spacings of cable termination points outwardly of the vertical axes. It may be seen, also, that yaw movement of the mirror 16 (as shown in phantom in FIG. 3) likewise precipitates arcuate movement of all but pulley 50 of transducer system 42. For this reason, pulleys 48 and 50 are constructed preferably for running out of alignment with one another in this particular embodiment adjacent the mirror 16. A drive belt 62 is provided, therefore, having sufficient elastic properties for accommodating the dimensional variations between pulleys 48 and 50. Drive belt 62 is preferably of a conventional non-slip design.

Referring now to FIGS. 4 through 7, in combination, one structure and method is shown which facilitates the independent field of view adjustment and flip actuation of the mirror 16, said structure and method being constructed in accordance with the principles of the present invention. A mechanical servo 64 may be seen, therefore, to be provided adjacent the bulkhead 54, which servo differentiates mirror control signals transmitted by cable element 52 extending from the control unit 10. One embodiment of the servo 64, shown fragmentarily in FIGS. 2 through 4, is illustrated in more detail in FIGS. 6 and 7. As may be seen in FIG. 6, the servo 64 includes an outer, generally cylindrical housing, 66 through which shielded cable element 52 extends. The servo 64 utilizes a biasing element in the form of spring clip 68 and a coupling assembly including limit pins 70 and 72, longitudinally disposed therefrom. The biasing element and coupling assembly permit the differentiation of mirror flip signals from mirror adjust signals. The method of and apparatus for the aforesaid signal differentiation may be described best by reference to the cross-sectional view of the servo 64 in FIG. 7.

As shown most clearly in FIG. 7, servo 64 is comprised of a transducer assembly 150 including a limit shaft 74 adjacent to the open end 76 of housing 66. The shaft 74 includes a central bore 78 through which the cable 52 may be received, without its shielded portion. The cable shield preferably terminates outside the housing 66 to permit cable actuation of the servo 64 and the pulley 50 adjacent thereto. The cable 52 extends through the limit shaft 74 and into an idler shaft 80 juxtaposed thereto; it next extends from idler shaft 80 into a clutch 82 positioned at a second end 84 of the housing 66, and, continues into and through a clutch support 86 adjacent a frontal bulkhead 54 of housing 66. The cable 52 further extends through the bulkhead 54 and terminates in the pulley 50 for rotating said pulley accordingly. It is the translation of the cable 52, as well as its rotation, which provides the dual purpose actuation as set forth below.

The spring clip 68 is disposed securely in slots 88 and 90 formed in the housing 66 and lightly engages the limit shaft 74 across a pair of flats 92—92 formed on opposite sides thereof. Flats 92—92 comprise ground or milled portions of limit shaft 74, with a sufficient width to permit requisite axial movement of said limit shaft for actuation purposes. The purpose of spring clip 68 is to bias the limit shaft in one of two 180° positions of the flip mode. Because the limit shaft 74 is downwardly threaded and secured to the cable 52, the respective 180° positions are similarly translated to the pulley 50 and transducer system 42 which effects an identical 180° flip of the mirror 16. Intermediate positions are otherwise unstable in this flip mode because the spring clip 68 will bear against both of the flats 92 of the limit shaft 74 holding said shaft in one of the 180° positions. The engagement of the spring clip 68 is, of course, a function of the rotational position of the housing 66, which, if rotated with the limit shaft 74, will not cause said spring clip to push against the flat 92. Thus, it will be seen that it is the interengagement of the housing 66 and limit shaft 74 which selectively prevents or facilitates minor pitch adjustment of the mirror 16 as compared to an intentional 180° flip thereof.

The limit shaft 74 is keyed into idler shaft 80 with an idler tongue 94, having a rectangular cross section, which precipitates synchronous rotation of said idler and limit shafts while permitting relative axial movement therebetween. A coupling spring 96 biases the idler shaft 80 away from limit shaft 74 while the limit pins 70 and 72 secure the relative axial position of the two shafts within the housing 66. Limit pin 70 is threadably mounted, preferably, in limit shaft 74, extending into the central bore 78 thereof for engaging and securing the cable 52 therein. A first 180° arcuate slot 100 is formed in the housing 66 for receiving the projection of limit pin 70. Similarly, a second 180° arcuate slot 102 is formed in the housing 66, in spaced parallel relationship with slot 100, for receiving the projection of limit pin 72 therein. A first end of the respective slots 100 and 102 also includes a pair of longitudinal slotted offsets 108 and 110, respectively. A second pair of slotted off-sets 104 and 106, respectively, are 180° disposed from said first set, relative the housing 66. The slots 100 and 102 permit rotation of the limit shaft 74 and idler shaft 80 relative to the housing 66. The four slotted offsets thereof comprise locking grooves for selectively effecting rotation of the limit and idler shafts 74 and 80 with the housing 66. Thus, it may be seen that translation of cable 52 toward pulley 50 will cause the limit and idler shafts 74 and 80 to move together. This result effects mirror control signal differentiation by coupling the housing 66 to the cable 52 and uncoupling the clutch 82 from said housing as described in more detail below.

Limit shaft 74 may be moved toward the idler shaft 80 until limit pin 70 engages the end of slot 104, as viewed in FIG. 6. At this point further linear movement of the cable 52 imparts linear movement to the housing 66 toward the pulley 50. Such movement is resisted by a servo mounting spring 112 disposed between the bulkhead 54 and housing 66. This translation causes the housing 66 to separate from the clutch 82, which is retained upon its support shaft 86 by a limit pin 114. A slot 116, preferably formed in the clutch 82, permits some degree of relative movement of the clutch 82 with the housing 66 for purposes of tolerance. The frictional engagement between clutch 82 and a mating portion 118 of the housing 66, which normally functions as a braking element to prevent rotation of said housing, is then broken and said housing is allowed to rotate with the limit shaft 74 and idler shaft 80. It may be seen that linear movement of the housing 66 for disengagement from the clutch 82 also causes limit pin 72 to enter slot 106, which serves as a stop to further linear movement. The rotation of the cable 52 in this interlocked configuration is not resisted by the spring clip 68, therefore, since it rotates also. Field of view adjustment of the mirror 16 is then facilitated and in this particular embodiment comprises the pitch thereof.

As shown in FIG. 6, flip adjustment of the mirror 16 from day-to-night is performed with the limit pins 70 and 72 in their free-biased rotational positions in slots 100 and 102, respectively. The housing 66 is held stationary by the clutch engagement and, therefore, all rotation of shafts 74 and 80 is biased by the spring clip 68 into respective 180° positions. This preprogrammed motion is transmitted to the mirror 16 which exhibits a responsive rotation. Hence, the pitch position of the mirror 16 is not altered by the flip. This advantageous aspect is due to the fact that the housing 66 is not rotated during the flip motion. It is the rotational position of said housing which determines mirror pitch. However, it is to be understood that the yaw control can be substituted in other embodiments incorporating a lateral flip about the vertical axis.

Referring now to FIGS. 8–11, there is shown an alternative mounting of the mechanical servo 64 adjacent the control unit 10. For purposes of further defining the structural configuration of the particular alternative embodiment of FIGS. 8 and 10, and others presented and contemplated herein, the following terms will be utilized. The assembly disposed within the housing 66, including the shafts 74 and 80, will be referred to as the signal transducer 150, in that it transmits the signal and energy of one system into that of another. The control unit 10 is conventionally mounted upon the door of the vehicle (not shown) in which it is installed, wherein a lever arm is generally provided and herein referred to as a control bat 160. A frame member commonly defines the aperture from which the control bat extends, which frame member is herein referred to as a bezel 162. When said bezel and control are mounted adjacent said transducer, the mirror 16 is actuated by an interconnection herein referred to as a pull cable system 170. The pull cable system contrasts the single cable drive actuating position transducer system 42 set forth and described in FIGS. 1–5 above.

Figure 8:
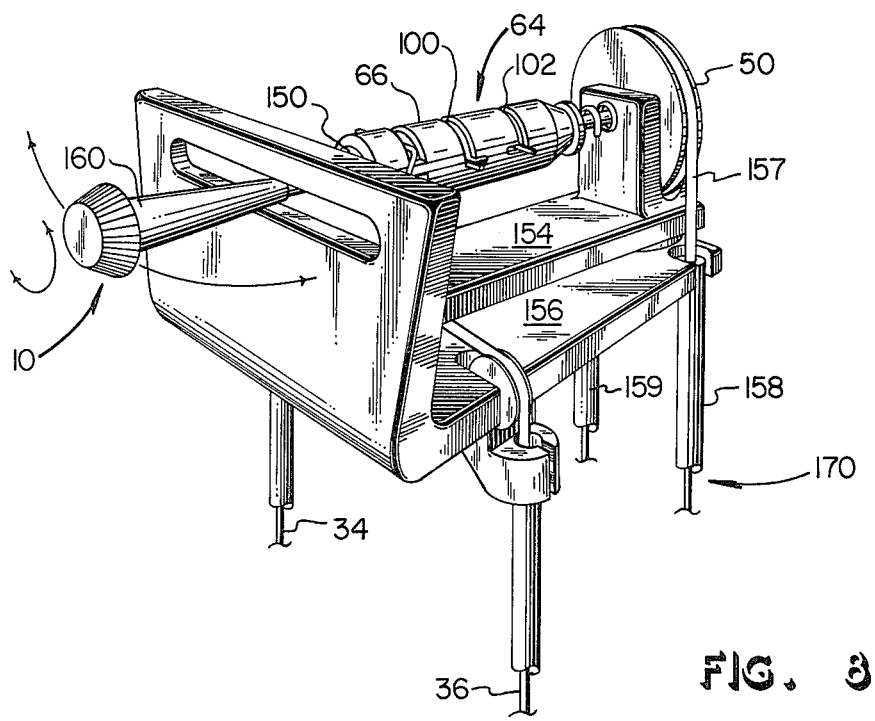
FIG. 8 is a perspective view of an alternative embodiment of a mechanical servo mounted adjacent the mirror control unit and illustrating a pull cable, mirror control system.

Referring specifically now to FIG. 8, there is shown a servo 64 generally equivalent in structure configuration to that shown in FIG. 6. The transducer 150 is, however, integrally connected to control bat 160, whereby translational and rotational movement thereof is directly communicated. Frontal bulkhead 54 of mirror housing 14 is replaced by pivot bulkhead 154. The housing 66 is mounted atop the bulkhead 154 which is adapted to arcuately pivot relative to a mounting chasis 156. A pull cable system 170 interconnects the bulkhead 154 with the mirror 16 wherein pitch, flip and yaw may be controlled. In the particular system interconnection shown herein the servo 64 is coupled to pulley 50 outboard of bulkhead 154 for pitch and flip control. A continuous cable 157 is seated within the pulley 50 and threaded through cable shields 158 and 159. The transducer 150 thus receives and transmits mirror control signals in the same actuation manner set forth above. However, unlike the yaw control of FIG. 2, the shielded yaw control cables 34 and 36 are connected to the pivot bulkhead 154 which is responsive to lateral movement of the control bat 160, as indicated by the arrows in the drawing.

Figure 9:
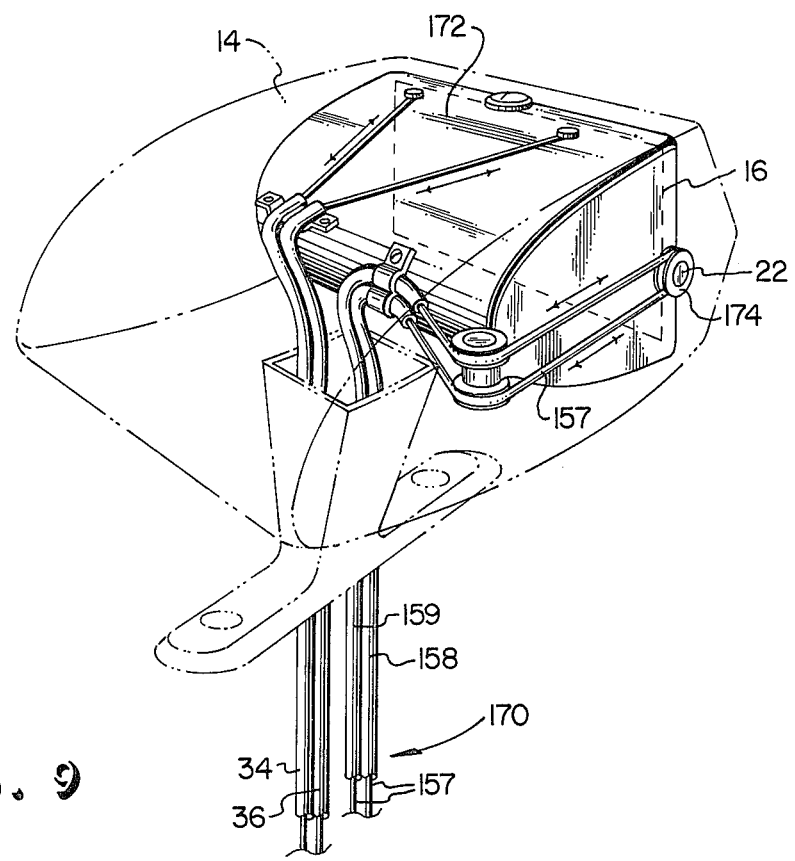
FIG. 9 is a perspective view of an alternative embodiment of a mirror housing connected to a pull cable control system and illustrating the method of mirror actuation facilitated thereby.

Referring now to FIG. 9, there is shown the conventional interconnection of pull cable system 170 with the mirror 16 gimbal mounted within a pull cable frame 172. Frame 172 may be seen to functionally replace the second, outer mirror frame 24 of FIG. 2. In like manner, a first mirror frame 18 (not shown) is mounted therein for movement about a horizontal axis, which axis terminates via pivot shaft 22 to a pulley 174. Frame 172 is also pivotally mounted within the housing 14. It may thus be seen that the termination of cables 34 and 36 upon the frame 172, straddling the center of rotation thereof, effectively facilitates yaw control in response to lateral movement of the control bat 160 and pivot bulkhead 154. In like manner, the rotation of said control bat and transducer 150 effects translation of the pitch, flip cable 157 secured around the pulley 174 and the resultant mirror movement defined thereby. In operation, the operation may thus control flip and pitch of the mirror 16 through selective depression of the control bat 160 in conjunction with its rotation. The angle of rotation of the transducer 150 necessary to effect a 180° flip of said mirror is a function of the relative sizes of pulleys 174 and 50. Therefore, it may be seen that limit slots 100 and 102 could be constructed to comprise less than a 180° section of the housing 66.

Figure 10:
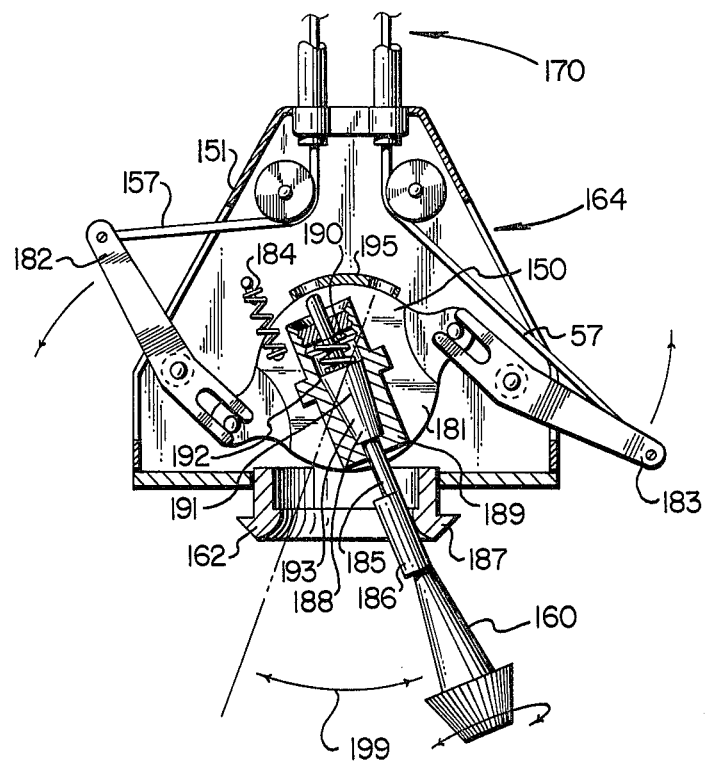
FIG. 10 is a side elevational view of an alternative embodiment of a mechanical servo constructed in accordance with the principles of the present invention and being mounted adjacent the mirror control unit.

Referring now to FIG. 10, there is shown a side elevational view of an alternative embodiment of a mechanical servo 164 constructed in accordance with the principles of the present invention and adapted for the pull cable system 170. The servo construction 164 also compirses a pull cable control unit utilizing a single transducer 150. The transducer 150 of FIG. 10 is supported within a first housing 151, which, unlike housing 66 of FIG. 8, is not rotatably mounted, but serves as a chasis structure adjacent the control bat 160. The housing 151 is constructed for supporting a first shaft member 181 of said transducer. The shaft 181 is rotatably mounted and coupled to a pair of lever arms 182 and 183 connected to the respective ends of pitch, flip cable 157. Translational movement of said cable is imparted by respective angulations of the pivot arms 182 and 183, responsive to rotation of the shaft 181. A biasing member, in the form of an over center spring 184 biases the shaft 181 into one of two rotated positions. The biased positions of said shaft is defined by the movement and relative position of a pivot arm 185 disposed within a bezel 162 secured therearound.

The pivot arm 185 includes a lateral eccentricity 186 formed thereon and adjacent the bezel 162. The side walls 187 of said bezel are flanged to provide a rigid engagement surface for the pivot arm 185. Atop the shaft 181 said pivot arm is mounted through a clutch assembly 188 into an inner transducer housing 189. Inner housing 189 is mounted within the shaft 181 to comprise a pivotal cable attachment unit. The pivot axis of housing 189 is generally orthonogal to the axis of rotation of the shaft 181, whereby the orthogonal axes of the mirror frame can be respectively controlled and shown in FIG. 9.

Clutch assembly 188 selectively interconnects the pivot arm 185 to the housing 189 and shaft 181. A spring member 190 is secured within the housing 189 to bias a coned clutch plate 191 against the side walls 192 of a mounting aperture 193 formed in said housing. An intermediate bulkhead 195 is provided within outer housing 151 as a stop for translational movement of the pivot arm 185 in any position, but the respective ends of rotation of the shaft 181. In this manner, the pivot arm 185 can not be depressed during rotation of the shaft 181. Depressing the pivot arm 185 compreses the spring 190 and separates the clutch plate 191 from side walls 192, thereby releasing the control bat 160 for rotation. The rotation of the control bat 160 imparts rotation to the pivot arm eccentricity 186, thereby varying the centerline distance between the bezel 187 and said pivot arm. Such variance is manifested in a minor rotation of shaft 181 and a redefining of the limits of the angle of rotation thereof. The dimensional parameters of the bezel 187, eccentricity 186 and shaft 181 are provided in a configuration whereby the pitch of the mirror 16 is the same before and after each mirror 180° flip. The mirror is flipped by manually pulling or pushing the control bat 160 from one side of the bezel 187 to the other, as reflected by the arrow 199.

Rotation of the shaft 181 to flip the mirror 16 and adjust the pitch thereof, effects angulation of pivot arms 182 and 183 which are cantilevered therefrom through a conventional slotted cam interface. The pivoting of said arms 182 and 183 may be seen to concomitantly translate the pitch, flip cable 57. Other functional design elements such as cable rollers and clamping devices are shown, but not discussed since some are considered conventional constructional considerations.

Figure 11:
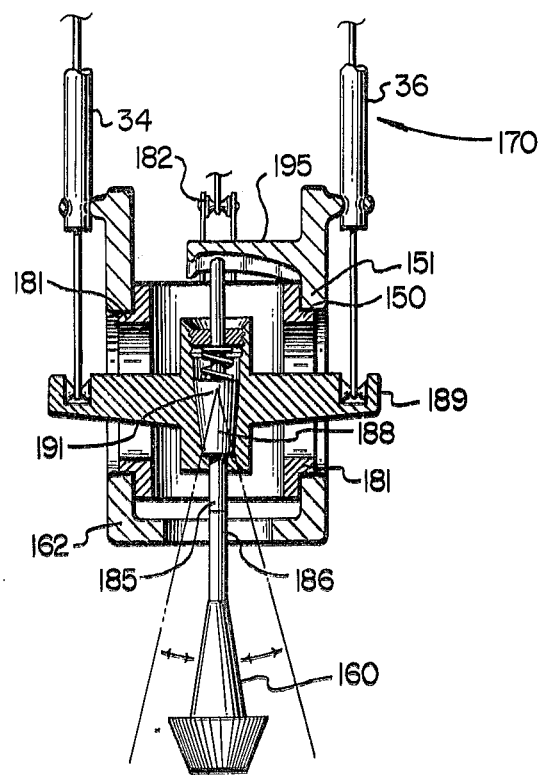
FIG. 11 is a top plan view of the servo of FIG. 10 with parts thereof sectioned away for purposes of clarity.

Referring now to FIG. 11, there is shown a top plan view of the servo 164 of FIG. 10. Various parts thereof have also been sectioned for purposes of clarity. Control bat 160 may thus be seen to engage the housing 189 through pivot arm 185. Movement of the control bat 160, as indicated by the arrows and phantom lines adjacent thereto, causes the pivoting of the housing 189. Yaw control cables 34 and 36 terminate at, and are secured to the housing end portions. The aforesaid pivoting of said housing produced concomitant translation of the yaw cables 34 and 36 in opposite directions, whereby the field of view of the mirror 16 is readjusted. The shaft 181 is also seen in this view as a centrally forced unit in which the housing 189 is received and mounted for pivotal actuation.

It may be seen that from the disclosure set forth above that actuation of a gimbal mounted mirror can be effected by a servo positioned adjacent the mirror or the control bat. In like manner, the servo design may be modified to include both yaw and pitch control transmitted therethrough. It may also be effected by less than a 180° rotation of the respective shaft assembly of the transducer, as provided by the appropriate cable drive ratio. The flip actuation of the mirror can also be modified to act in conjunction with the respective yaw control rather than pitch control. In this manner the mirror would flip 180° about its vertical axis of rotation. With such modifications, however, the various advantageous aspects of the invention remain uneffected. For example, with either servo mechanism embodiment, fine adjustment of the related mirror field of view position is prevented during the flip actuation. In servo 164 the bulkhead 195 locks the clutch plate against the side walls 192. In servo 64, the clutch 82 remains locked against the housing 66 until both limit pins are engaged in their respective notches. In this manner, the operator can not accidentally change the related field of view during day to night changes. Similarly, the operator must consciously push in on the control bat 160 in order to vary the field of view which it controls.

It is thus believed that the operation and construction of the present invention will be apparent from the foregoing description. While the apparatus shown and described has been characterized as being preferred, it will be obvious that various changes and modifications may be made therein without departing from the spirit and scope of the invention as defined in the following claims.

We claim:

1. In a remote control for day-night, outside, rearview mirror apparatus of the type comprising a double sided mirror supported within a first frame member rotatably mounted for pitch movement of the mirror and a second frame member rotatably mounted for yaw movement, wherein said frame members are interconnected for mirror field of view adjustment and 180° mirror flip actuation to a remote control bat through a plurality of control cables effecting synchronous pivotal control thereof, the improvement including a mechanical servo adapted for differentiating translational and rotational control bat signals into segregated mirror flip and field of view adjustment actuation, said mechanical servo comprising:

a servo housing disposed relative to said control bat and between said mirror and said control bat;

a signal transducer mounted within said housing for translational and rotational movement and connected to an end of at least one said control cables for differentiating mirror flip signals from mirror field of view adjustment signals;

said transducer including clutch means for selectively interconnecting said transducer and said housing for providing controlled relative translational and rotational movement therebetween in response to mirror adjust signals; and means for connecting said transducer and one of said mirror frame members, wherein mirror adjustment and flip signals inputted into said housing may be differentially transmitted to said mirror to effect a resultant 180° flip thereof and substantially identical field of view positions therefor.

2. The improved control apparatus as set forth in claim 1 wherein said servo housing is pivotally mounted adjacent the control bat and integrally connected to first ends of said control cables interconnecting one of said mirror frames members thereto and wherein said transducer is connected to first ends of said control cables interconnecting the other of said mirror frame members thereto, said transducer being movably mounted within said housing for actuating flip actuation of said mirror independent of pitch and yaw movements thereof.

3. The improved control apparatus as set forth in claim 2 wherein said transducer includes means biasing said transducer into a controlled rotational shift configuration relative to said housing and comprising two opposing rotational positions effecting the resultant 180° flip of said mirror.

4. The improved control apparatus as set forth in claim 3 wherein said transducer comprises a shaft assembly rotatably mounted within a housing and including a pair of outwardly biased limit pins engaging laterally slotted portions of said housing and defining opposing positions of said biased shift configuration of said transducer relative said housing.

5. The improved control apparatus as set forth in claim 4 wherein said transducer is connected to said control cables by a pulley mounted on the end of said housing and keyed to rotation of said transducer.

6. The improved control apparatus as set forth in claim 2 wherein said transducer is connected to cables interconnecting said first frame member thereto for pitch and flip actuation of said mirror and wherein said housing is connected to cables interconnecting said second frame member thereto for yaw actuation of said mirror.

7. The improved control apparatus as set forth in claim 2 wherein said transducer is comprised of a shaft assembly having an adjustable rotation angle mounted within said housing and including a pivot arm attached to said control bat and formed with a lateral eccentricity, said pivot arm being rotatably mounted upon and outwardly of said shaft, and wherein a flanged bezel member is fixedly secured outwardly of said housing for receiving said pivot arm therethrough and laterally thereagainst.

8. The improved control apparatus as set forth in claim 7 wherein said shaft assembly also includes cable pull linkage interconnected therewith for complemental cable translation responsive to shaft rotation.

9. The improved control apparatus as set forth in claim 7 wherein said clutch means selectively locks the rotational position of said pivot arm relative said shaft and concomitantly the region of said lateral eccentricity of said pivot arm adjacent said flanged bezel member for selectively defining one end of the rotation angle of said pivot arm.

10. The improved control apparatus as set forth in claim 9 wherein said shaft is biased toward the respective ends of said rotation angle thereof and wherein said housing includes an intermediate bulkhead adjacent a central portion of the path of rotation of said shaft and said pivot arm whereby translational movement of said pivot arm is blocked during rotation of said shaft.

11. An improved remote control for day-night, outside, rearview mirror apparatus of the type comprising a double sided mirror supported within a first frame member rotatably mounted for pitch movement of the mirror and second frame member rotatably mounted for yaw motion, wherein said frame members are interconnected to a remote control bat through a plurality of control cables effecting synchronous pivotal control thereof, wherein the improvement comprises a mechanical servo control including:

a servo housing disposed relative to said mirror and between said mirror and said control bat;

a signal transducer rotatably mounted within said housing and connected to an end of at least one of said control cables for differentiating mirror flip signals from mirror field of view adjustment signals;

said transducer including clutch means for selectively interconnecting said transducer and said housing for providing controlled relative translational and rotational movement therebetween in response to mirror adjust signals;

means for connecting said transducer and one of said mirror frame members, wherein mirror adjustment and flip signals inputted into said housing may be differentially transmitted to said mirror; and means for biasing said transducer relative said housing into a controlled shift configuration including two opposing positions effecting a resultant 180° flip position and substantially identical field of view positions.

12. The improved control apparatus as set forth in claim 11 wherein said control bat is connected to first ends of said control cables, the second ends of which are respectively connected, to one of said mirror frame members for controlling field of view movement thereof and to said mechanical servo, secured adjacent said mirror, for actuating the pitch and flip of said first frame member thereof.

13. The improved control apparatus as set forth in claim 12 wherein said transducer is comprised of a shaft assembly rotatably mounted within said housing and including a pair of limit pins engaging laterally slotted portions of said housing, and being biased outwardly one from the other in combination with said means biasing said transducer wherein said limit pins define said opposing positions of said biased shift configuration of said transducer relative said housing.

14. The improved control apparatus as set forth in claim 13 wherein said slotted portions of said housing include longitudinally notched sections on opposite ends thereof adapted for receiving said limit pins of said transducer during translational movement thereof, said limit pins thereby engaging said housing for concomitant rotational movement therewith during field of view adjustment of said mirror.

15. The improved control apparatus as set forth in claim 14 wherein said clutch means includes a clutch plate biased against said housing in combination with said outwardly biasing of said limit pins wherein translational movement of said transducer causes at least one of said limit pins to be engaged by one said notched sections to impart longitudinal movement to said housing for disengaging said clutch plate.

16. An improved control apparatus for an outside, day-night, rearview mirror of the type having reflective surfaces on relative opposite sides thereof and supported within gimbal mounted mirror frame means connected to a control bat through a series of control cables adapted for sychronous pivotal control of said mirror in adjusting the bi-axial field of view and day-night flip configuration thereof, said improvement comprising a mechanical servo adapted for flipping said mirror to respectively identical field of view positions and being interposed between and interconnected with said mirror and control bat and including a housing having a movable transducer assembly mounted therein and coupled thereto in selectable interengagement, which interengagement is responsive to actuation of said control bat for controllably segregating an imparted transducer movement for purposes of flipping said mirror from an imparted transudcer movement for purposes of adjusting the field of view of said mirror.

17. The improved control apparatus as set forth in claim 16 wherein said servo is mounted adjacent the control bat and integrally connected to first ends of said control cables, the second ends of said cables being connected to said mirror frame means.

18. The improved control apparatus as set forth in claim 16 wherein said servo in mounted adjacent the mirror and integrally connected to a second end of one said control cables, the first end of said cables being connected to said control bat and the second end of other ones of said cables being connected to said mirror frame means.

19. The improved control apparatus as set forth in claim 16 wherein said transducer comprises a shaft assembly rotatably mounted within said housing and including a pair of outwardly biased limit pins engaging laterally slotted portions of said housing and defining opposing positions of shaft rotation relative thereto.

20. The improved control apparatus as set forth in claim 19 wherein said shaft assembly is biased into a controlled rotational shift configuration relative to said housing, said shift configuration being defined by said opposing positions of said limit pins in the slotted positions of said housing.

21. The improved control apparatus as set forth in claim 20 wherein said shaft assembly comprises first and second shaft elements, keyed one to the other for relative translational movement and synchronous rotational motion, and wherein one each of said limit pins is fixedly secured to each of said shaft elements, biased one from the other by a spring element juxtaposed therebetween.

22. The improved control apparatus as set forth in claim 16 wherein a bezel frame member is secured adjacent said control bat, said transducer comprises a shaft assembly having an adjustable rotation angle mounted within said housing, and wherein said transducer includes a laterally extending pivot arm attached to said control bat and formed with a lateral eccentricity positioned adjacent the side walls of the bezel frame member for bearing thereagainst and defining the respective ends of said shaft rotation angle.

23. The improved control apparatus as set fourth in claim 22 wherein said shaft assembly includes a clutch means for selectively locking the rotational position of said pivot arm relative to said shaft and wherein said shaft is biased toward the respective ends of said rotation angle at which ends said clutch means is responsive to translational movement of said pivot arm to release said pivot arm for rotational movement.

24. A day-night outside rearview mirror apparatus comprising;
a remote control bat adapted for receiving both translational and rotational actuation for the transmission of mirror control signals;
a mirror having reflective surfaces on relative opposite sides thereof;
first and second mirror support frames pivotal about different given axes and supporting said mirror for pitch, flip and yaw movement;
remote control cable means interconnecting said control bat and said mirror support frames for synchronous flipping and pivotal adjustment of said field of view of said mirror; and
a mechanical servo interposed between said mirror and said control bat and connected to certain ones of said control cables for receiving both translational and rotational signals from said control bat said servo including a signal transducer assembly mounted within a housing and coupled thereto in a selectable translational interengagement for segregating transducer rotation for purposes of flipping said mirror from transducer rotation for purposes of adjusting the field of view of said mirror.

25. The mirror apparatus as set forth in claim 24 wherein said housing is mounted adjacent said control bat and integrally connected to first ends of said control cables, the second ends of said cables being connected to said first and second mirror support frames.

26. The mirror apparatus as set forth in claim 24 wherein said transducer comprises a shaft assembly rotatably mounted within said housing and including a pair of limit pins, biased outwardly one from the other, and engaging laterally slotted portions of said housing to define opposing positions of shaft rotation relative thereto.

27. The mirror apparatus as set forth in claim 26 wherein said slotted portions of said housing include notched sections on respective ends thereof for receiving said limit pins therein concomitantly with translation of said shaft assembly to couple said shaft assembly to said housing for joint rotation thereof.

28. The mirror apparatus as set forth in claim 24 wherein said transducer is mounted adjacent said control bat and comprises a shaft assembly rotatably mounted within said housing, and wherein a bezel frame member is secured adjacent said control bat for defining the limits of movement of said control bat therein, said control bat being affixed to the end of a pivot arm integrally coupled to said shaft assembly for translational and rotational interengagement.

29. The mirror apparatus as set forth in claim 28 wherein said pivot arm includes a lateral eccentricity adjacent the side walls of said bezel for bearing thereagainst and defining the respective ends of rotational movement of said shaft assembly, said ends of rotational movement being adjustable by the rotational position of said eccentricity relative to said bezel.

30. The mirror apparatus as set forth in claim 28 wherein said shaft assembly includes cable pull linkage interconnected therewith and certain ones of said control cables for complemental cable translation responsive to shaft rotation, and wherein said housing is pivotally mounted and interconnected with certain ones of said control cables for translation thereof in response to angulation of said housing.

31. The mirror apparatus as set forth in claim 30 wherein said cables interconnecting said housing and said mirror support frame actuate yaw movement thereof and wherein said cables interconnecting said transducer and said mirror support frame actuate flip and pitch actuation of said mirror for effecting a 180° flip thereof and substantially identical pitch position.

* * * * *